United States Patent [19]
Adiutori et al.

[11] Patent Number: 5,353,865
[45] Date of Patent: Oct. 11, 1994

[54] ENHANCED IMPINGEMENT COOLED COMPONENTS

[75] Inventors: Eugene F. Adiutori, W. Chester; Byron A. Pritchard, Jr., Loveland; Stephen Aleshin, Cincinnati, all of Ohio

[73] Assignee: General Electric Company, Cincinnati, Ohio

[21] Appl. No.: 860,397

[22] Filed: Mar. 30, 1992

[51] Int. Cl.$^5$ .................................. F28F 13/18
[52] U.S. Cl. ........................ 165/133; 165/109.1; 165/908
[58] Field of Search .............. 165/133, 185, 109.1, 165/908; 138/38

[56] References Cited

U.S. PATENT DOCUMENTS

| | | | |
|---|---|---|---|
| 3,388,888 | 6/1968 | Kercher et al. | 253/39.1 |
| 3,800,864 | 4/1974 | Hauser et al. | 165/47 |
| 4,108,242 | 8/1978 | Searight et al. | 165/164 |
| 4,216,825 | 8/1980 | Sumitomo | 165/109.1 |
| 4,277,816 | 7/1981 | Dunn et al. | 361/384 |
| 4,573,865 | 3/1986 | Hsia et al. | 415/155 |
| 4,724,299 | 2/1988 | Hammeke | 219/121 L |
| 4,730,093 | 3/1988 | Mehta et al. | 219/121 LC |
| 4,743,733 | 5/1988 | Mehta et al. | 219/121 LF |
| 4,835,958 | 6/1989 | Rice | 60/39.05 |
| 4,864,827 | 9/1989 | Richardson et al. | 60/756 |
| 4,916,905 | 4/1990 | Havercroft et al. | 60/756 |
| 4,934,145 | 6/1990 | Zeisser | 60/756 |
| 4,958,058 | 9/1990 | Scheidt et al. | 219/121.6 |
| 5,038,014 | 8/1991 | Pratt et al. | 219/121.64 |
| 5,043,548 | 8/1991 | Whitney et al. | 219/121.47 |

FOREIGN PATENT DOCUMENTS

| | | | |
|---|---|---|---|
| 2143155 | 3/1972 | Fed. Rep. of Germany | 165/908 |
| 640108 | 12/1978 | U.S.S.R. | 165/908 |
| 394324 | 6/1933 | United Kingdom | 165/185 |

OTHER PUBLICATIONS

"Air Jet Impingement on a Miniature Pin–Fin Heat Sink," by B. W. Bartilson, The American Society of Mechanical Engineers, pp. 1–8, 91-WA-EEP-41.

Primary Examiner—Allen J. Flanigan
Attorney, Agent, or Firm—Jerome C. Squillaro; John R. Rafter

[57] ABSTRACT

An improved heat transfer assembly includes a textured impingement surface and means for impinging cooling air directly upon the textured surface. A component includes a surface textured to increase convective heat transfer with minimal increase in resistance to conductive heat transfer through the component. The textured surface can comprise an array of closely spaced hemispherically shaped protuberances. A method is disclosed for texturing a surface with discrete laser welds.

5 Claims, 3 Drawing Sheets

ENHANCED IMPINGEMENT COOLED COMPONENTS

This application cross-references concurrently filed and related U.S. patent applications entitled "Integral Combustor Splashplate and Sleeve," by Falls et al., Ser. No. 08/089,058, and "Improved Combustor Dome Splashplate," by Falls et al., Ser. No. 07/859,911, now abandoned, both assigned to the General Electric Company.

BACKGROUND OF THE INVENTION

The present invention relates to heat transfer in Jet engine components and, more particularly, to an improved impingement heat transfer assembly for use in jet engines.

Impingement cooling systems are commonly used in gas turbine engines. Typically, a perforated liner spaced from a heated member, such as a shroud, directs cooling air substantially normally to the surface of the shroud in order to enhance turbulence and improve the convective heat transfer coefficient at the surface. U.S. Pat. No. 3,388,888, issued to Kercher et al., and assigned to the General Electric Company, discloses impingement cooling for providing high heat transfer coefficients at the leading edge of turbine vanes. U.S. Pat. No. 3,800,864, issued to Hauser et al., and assigned to the General Electric Company, teaches that impingement of cooling air on a smooth surface is known. Hauser teaches that impingement is disadvantageous due to blockage of the liner perforations and inefficient use of cooling air. (Col. 4, line 1-6.) Hauser proposes a plurality of protuberances or pin-fine extending from a face, and an aperture for flowing cooling air over the face in parallel or counterflow heat transfer relationship (Col. 4, lines 28-42, Col. 5.) The protuberances serve the function of increasing the effective convective heat flow area and perform the function performed by the liner apertures in the known impingement systems. (Col 4, lines 31-37.) The arrangement of protuberances can be varied as to quantity per unit area. (Col 4, lines 64-66.)

U.S. Pat. No. 4,934,145, issued to Zeisser, discloses a combustor heat shield assembly where cooling air is impinged on the back of a plate, and is then directed by ridges to flow outward parallel to the back of the plate to enter a region which includes a plurality of individual pin fins extending from the back of the plate. (Col. 3, lines 29-53.)

U.S. Pat. No. 4,916,905, issued to Hayercroft et al., discloses a first perforated member and a second member including a large number of projections extending from the second member to positions closely adjacent the first member. (Col. 2, lines 30-40.) Cold air flows through perforations in the first member and onto and around the projections. (Col. 2, lines 45-50.) The spacing between the first and second members must be sized sufficiently large to accommodate flow of the cooling flow between the two members. Therefore, because the projections extend closely adjacent the first member, the projection height above the second member will be relatively large. Also, Havercroft mandates that the projections should not be aligned with the perforations in the first member, because projections closely spaced from the first member and aligned with the perforations would block the flow exiting the perforations.

U.S. Pat. No. 4,864,827, issued to Richardson et al., discloses first and second combustor skins spaced apart by a plurality of cylindrical pedestals attached to the second skin. The pedestals are cooled by a cooling airflow metered into the space between the skins by apertures.

Gas turbine engines under development today must be capable of running at higher turbine operating temperatures to provide the improved efficiencies demanded by customers. The cooling air used to cool high temperature components represents a performance penalty, and the amount of cooling air must be minimized. While the above-mentioned patents address improved cooling efficiency and increased convection cooling surface area, engineers and scientists continue to search for ways to increase gas turbine operating efficiencies by using cooling air as efficiently as possible.

OBJECTS OF THE INVENTION

Accordingly, one object of the present invention is to provide an improved heat transfer assembly for more efficient use of cooling air.

Another object of the present invention is to provide an improved heat transfer assembly including a textured impingement surface.

Another object of the present invention is to provide an improved heat transfer assembly having an increased impingement surface area.

Another object of the present invention is to provide an improved heat transfer assembly which provides a decrease in resistance to convection heat transfer which is greater than an associated increase in resistance to conduction heat transfer, thereby providing a net decrease in resistance to heat transfer through a component.

Another object of the present invention is to provide a welding method for texturing a surface for improved heat transfer.

SUMMARY OF THE INVENTION

An improved component heat transfer assembly includes a component with a textured first surface, and impingement means spaced from the textured surface for directing an impinging fluid to impinge upon the textured surface. The impingement means preferably includes a plate with an array of apertures for directing the impinging fluid substantially perpendicularly to the textured surface. The first surface can be textured with a plurality of surface features extending between an imaginary first plane and a second imaginary plane spaced from the first plane. For instance, the first surface can be textured with a plurality of protuberances disposed on the first surface, and extending from the first plane to the second plane. Impingement means can be spaced from the surface features to direct impinging fluid to directly impinge upon the textured surface at a plurality of surface elevations between the first and second imaginary planes. For instance, the impingement means can be spaced from the first surface for directing an impinging fluid to directly impinge upon protuberances disposed on the first surface.

The surface features can comprise an array of closely spaced protuberances, such as discrete hemispherical protuberances extending from the first surface, or according to one alternative, the textured surface can comprise a plurality of ridges disposed in the first surface. The protuberances are preferably closely spaced without roughing to provide increased surface area for impingement. The maximum protuberance-to-protuberance spacing on the first surface is preferably less than twice the maximum protuberance width parallel to the first surface, and in one preferred embodiment is about 1.1 times the maximum protuberance width.

In high heat flux applications the protuberance height should be as small as possible in order to minimize the additional conductive thermal resistance A5 through the component due to the protuberances. The protuberance height should be sized so that the increase in conductive thermal resistance through the component due to the protuberances is less than the decrease in convective thermal resistance at the textured surface due to the increased impingement area provided by the protuberances. The protuberance height can be less than 0.020 inch, and preferably no more than 0.010 inch to provide minimal resistance to conduction heat transfer through the component.

The surface can be textured by methods such as casting, electro-discharge machining or flame spraying. The method of texturing the surface may depend on accessibility to the surface and cost considerations. An alternative laser weld method for texturing a surface with a plurality of weld protuberances can include: supporting a component first surface for motion relative to a laser beam axis, positioning a first pre-determined location on the surface along the laser beam axis, flowing an alloy powder stream to the first pre-determined location, holding the surface stationary for a first pre-determined time period, energizing the laser beam for a predetermined weld dwell time to form a molten pool and weld protuberance on the first surface, holding the surface stationary for a second pre-determined time period to allow a formed weld protuberance to fully solidify, and positioning a second pre-determined location on the surface along the laser beam axis to repeat the weld process. The positioning of the surface with respect to the laser beam axis can be numerically controlled to form an array of discrete weld protuberances.

BRIEF DESCRIPTION OF DRAWINGS

FIG. 2 is a schematic illustration of the view taken along lines 2—2 in FIG. 1a.

DISCLOSURE OF THE INVENTION

Figure 1:
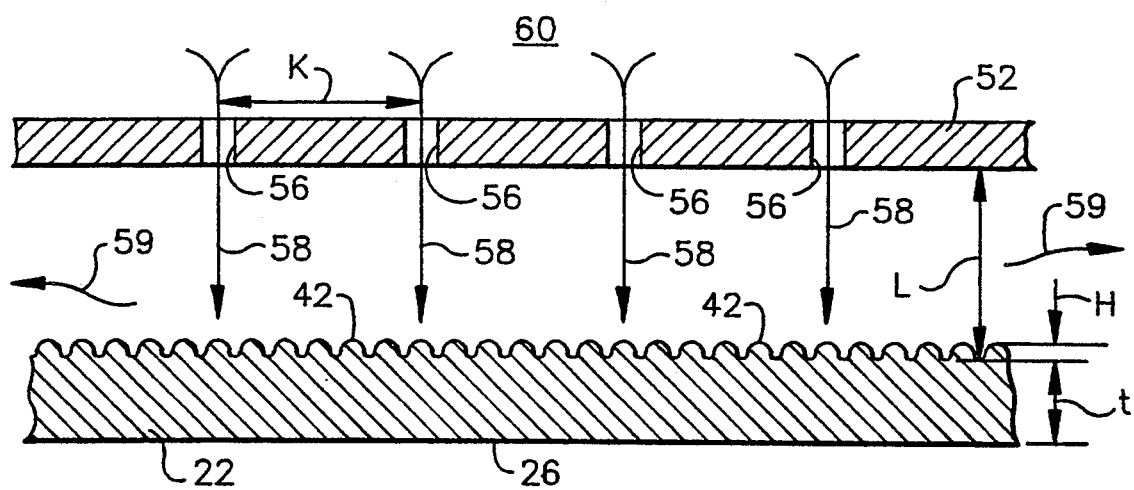
FIG. 1 is a cross-sectional schematic illustration of the improved heat transfer assembly according to the present invention.
Figure 1A:
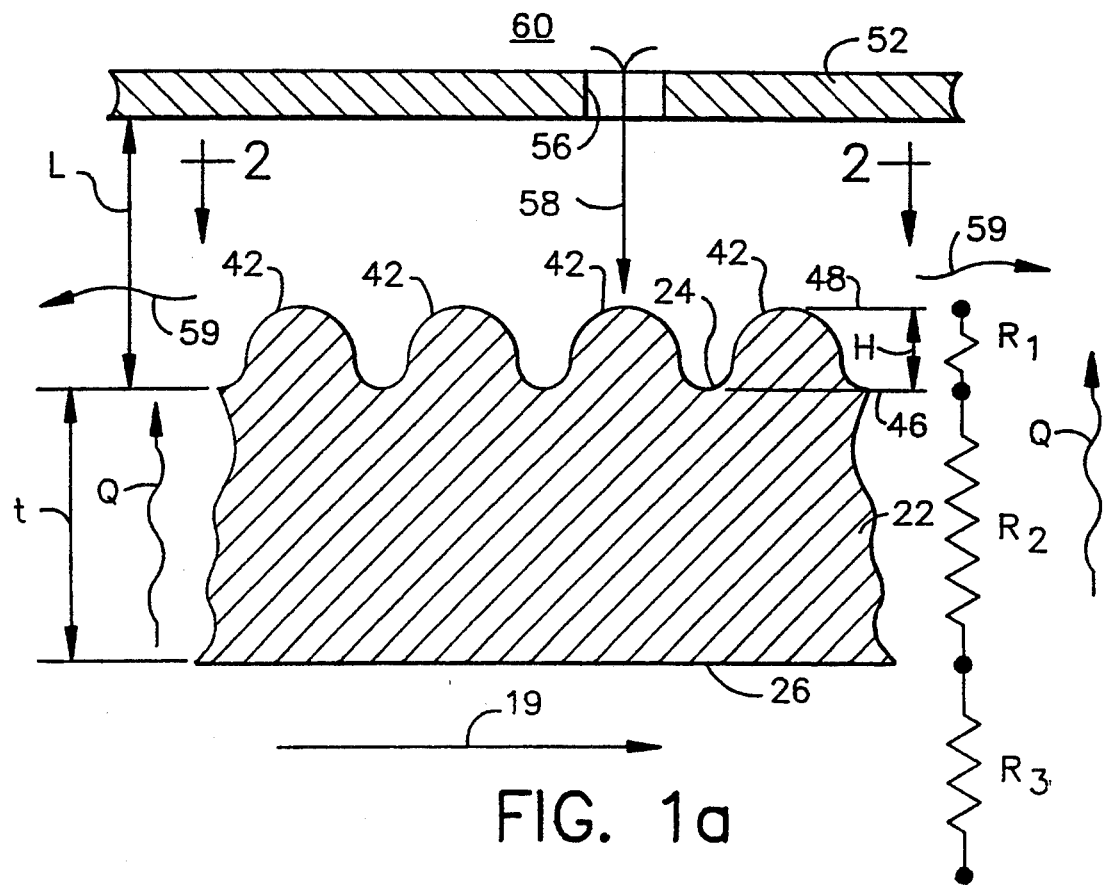
FIG. 1a is an enlarged view of the illustration in FIG. 1.
Figure 2:
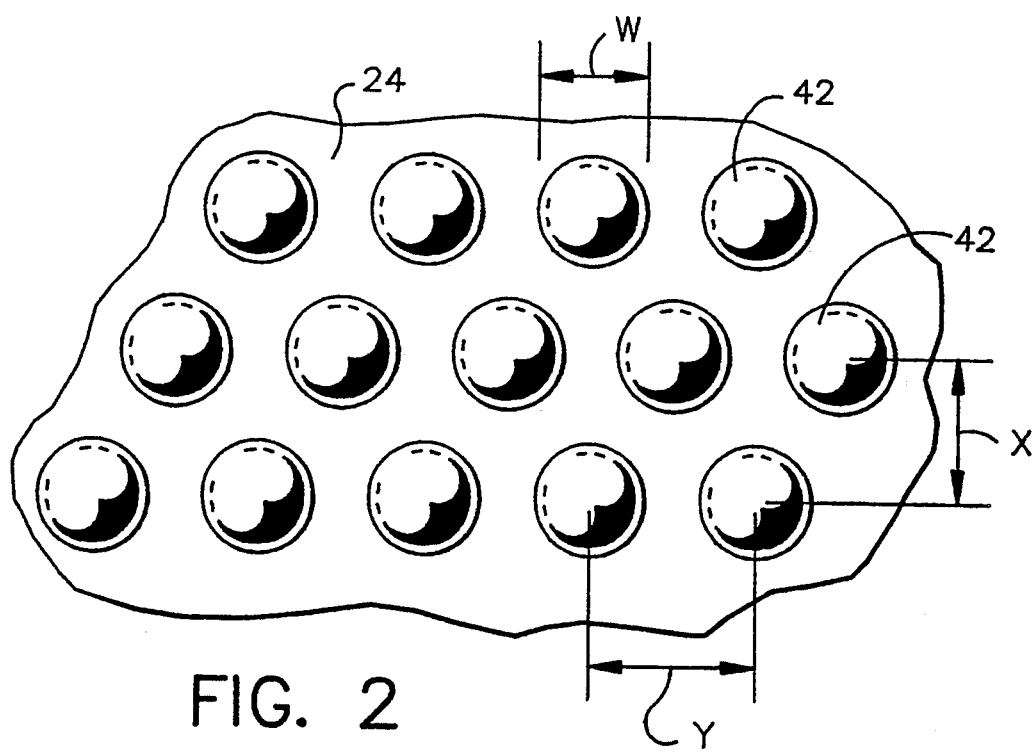

FIGS. 1, 1a, and 2, illustrate an improved component heat transfer assembly according to the present invention. The improved heat transfer assembly can comprise a component 22 with a first surface 24 which can be separated from a second surface 26 by a component thickness t. The first surface 24 is textured by an array of surface features extending between a first imaginary plane 46 and a second imaginary plane 48, such as a plurality of protuberances 42 with height H extending from first surface 24. The surface features can comprise a uniform or patterned array. An impingement means such as an apertured plate 52 is spaced from the first surface 24 and plane 46 by a spacing L, and includes an array of apertures 56 with center to center spacing K for directing impinging fluid jets 58 to directly impinge upon a plurality of the protuberances 42. Jets 58 impinge on the textured surface between planes 46 and 48 and so impinge upon the textured surface at a plurality of surface elevations, as compared to impingement upon a smooth surface. Fluid jets 58 fed by a pressurized plenum 60 can be directed substantially perpendicularly to first surface 24. Spent impingement fluid 59 can be channeled in the space between the protuberances 42 and the impingement means 52 for discharge at points not shown.

The second surface 26 can face a relatively high temperature gas flow 19, so that a heat flux Q is established through the component thickness t. The heat flux Q must be transferred by convection at the first and second surfaces 24 and 26 and by conduction through the component thickness in order to maintain the component 22 and surface 26 at an acceptable steady state temperature.

It is well known in the art that the steady state heat transfer rate by convection at a surface facing a gas stream can be expressed as:

$$Q = (h)(A)(T_w - T_s)$$

where h is the convective heat transfer coefficient at the surface, A is the area of the surface, Tw is the wall, or surface temperature, and Ts is the free stream temperature of the gas stream. In many cases impingement increases the value of h and therefore increases the convective heat transfer rate at a surface.

It is also well known that the steady state one dimensional heat transfer rate by conduction through a component with thickness t can be expressed as:

$$Q = (k)(A)(T_{w1} - T_{w2})/(t)$$

where k is the thermal conductivity of the component material, A is the area of the component normal to the direction of heat transfer, Tw1 is the component temperature at a first component surface, and Tw2 is the component temperature at a second component surface spaced from the first surface by component thickness t. Q decreases as thickness t increases, so that increasing the component thickness t increases the resistance to heat transfer by conduction. For steady state temperature conditions, energy continuity considerations require that the heat transfer rate Q by conduction through the component must equal the heat transfer rate by convection at the component surfaces.

It is convenient to view the resistance to heat transfer by convection and conduction as three resistances R1–R3 in series as shown in FIG. 1a. R1 is the resistance to convective heat transfer at a first surface and is a function of the quantity 1/(hA). R2 is the resistance to conduction through the component 22 and is a function of t/(kA). R3 is the resistance to convection at a second surface. The heat flux Q through each of the resistances is equal, and the total resistance to heat flux Q is the sum R1+R2+R3.

Cooling ribs or pin fins added to a surface may increase the convection heat transfer coefficient by increasing surface area. However ribs or pin-fins constitute an added resistance to conduction heat transfer because they extend above the component surface and locally increase the thickness and conduction resistance of the component. In some high heat flux applications, such as some gas turbine components, the addition of pin fins can actually decrease the heat transfer rate Q, because the increase in R2 due to the local increase in component thickness caused by addition of the fin can be greater than the decrease in R1 due to the increased convection surface area. The increase in conduction resistance can increase faster than the decrease in convection resistance as the fin or rib height is increased to provide more surface area. Therefore, especially in high heat flux applications, the effectiveness of prior art pin-fin or rib constructions is limited.

The present invention recognizes this limitation of conventional rib or pin-fin heat transfer arrangements. The present invention reduces convective thermal resistance at a component surface with minimal increase in conductive thermal resistance through the component, so that the net resistance to heat transfer is decreased.

The invention combines impingement with a textured impingement surface. The textured surface provides an increased surface area, and in particular an increased surface area for impingement. Therefore, the quantity 1/(hA), representing convective thermal resistance, is decreased by impinging on a textured surface as compared to impingement on a smooth surface. Further, in some applications impingement normal to the surface increases the value of the convective heat transfer coefficient, h, relative to the value of h in known pin fin or rib arrangements where the flow is parallel to the surface.

In addition, the surface features or protuberances in the present invention are sized such that the convective thermal resistance at the surface is decreased more than the conductive thermal resistance through the component is increased. The height of the surface features between the first and second imaginary planes, or the protuberance height H, can be sized according to the following approximate formula derived from applicants' testing:

Equation 1: H (maximum)$\leq$(0.2)(k)/(h) where M is the height of the surface features or protuberances in feet, k is the thermal conductivity of the component in BTU/(hr)(ft)(deg F), and h is the heat transfer coefficient at the textured surface in BTU/(hr)(square ft)(deg F.). For example, if h is 1500 BTU/(hr)(square ft)(deg F.) and k is 8 BTU/(hr)(ft)(deg F.), the maximum height of the surface features H is about 0.013 inch. Equation 1 provides the maximum height of surface features or protuberances which decreases convective thermal resistance more than the accompanying increase in the conductive thermal resistance through the component.

Referring to FIGS. 1 and 2, the textured impingement surface can comprise small closely spaced generally hemispherically shaped protuberances 42 which provide a relatively large increase in convection and impingement surface area for a given protuberance height H. Other protuberance shapes such as inverted cones or pyramids could also be used.

In some high heat flux applications Equation 1 will indicate that the protuberance height H should be less than 0.020 inch and preferably no more than 0.01 inch to minimize the protuberance resistance to conduction heat transfer. The protuberance width w should be kept small, such as not more than 0.015 to 0.025 inch. The protuberances 42 are preferably closely spaced without touching for maximum surface area, with protuberance to protuberance spacing x and y in FIG. 2 less than twice the width w of the protuberances. In one preferred application, the spacing can be less than or equal to 1.1 times the width w.

Figure 2A:
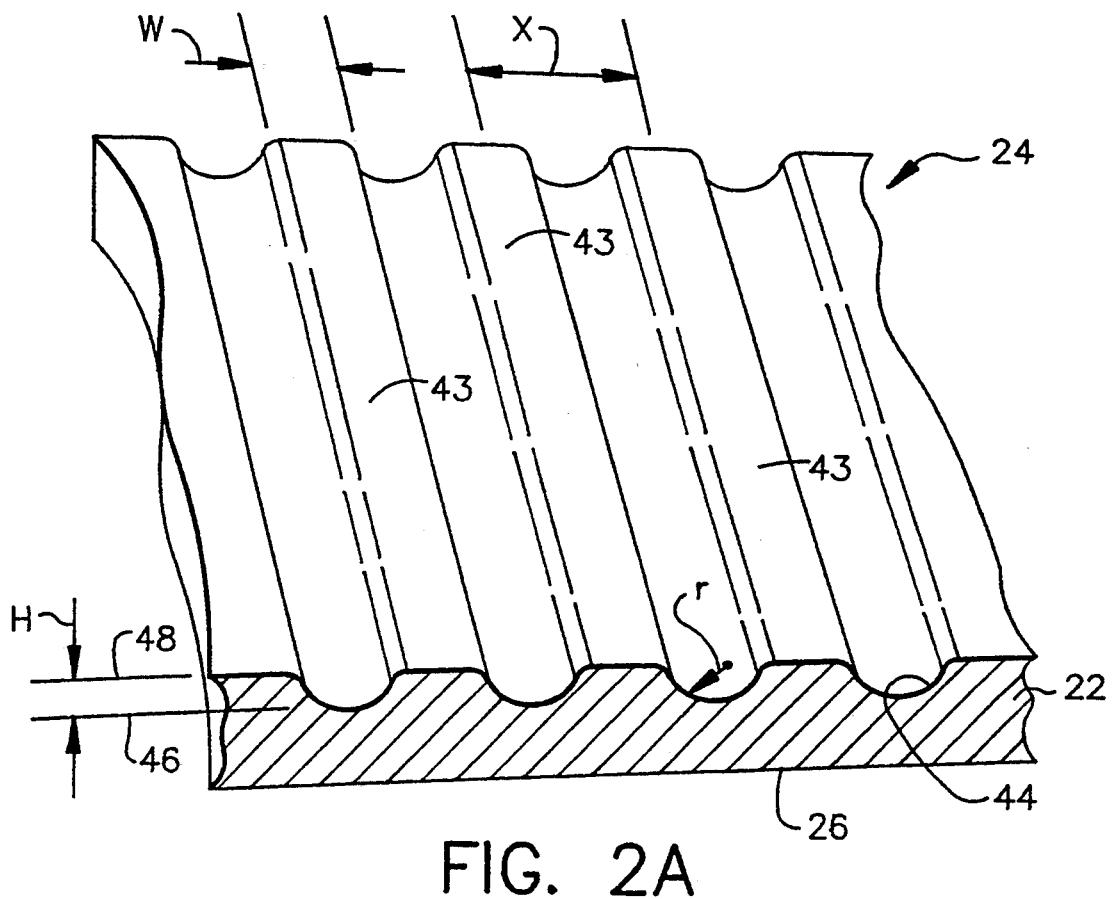
FIG. 2A is a schematic perspective illustration of an impingement surface textured with a plurality of ridges according to the present invention.

FIGS. 1 and 2 show generally hemispherically shaped protuberances forming a textured impingement surface. A surface can also be textured by forming or machining surface features such as ridges in a first surface 24. For example, FIG. 2A shows a textured impingement surface comprising an array of continuous or semi-continuous ridges 43 disposed in first surface 24 and extending between imaginary planes 46 and 48 with width w and height H. Ridges 43 can be formed by machined grooves 44 with radius r equal to height H. Ridges 43 are preferably closely spaced without touching, with width w less than or equal to radius r. Ridge width w can approach zero to form substantially pointed ridges 43. In some high heat flux applications Equation 1 will show that the ridge height H should be less than 0.020 inch and preferably no more than 0.01 inch.

The impingement plate 52 in FIG. 1 is spaced from the first surface 24 by spacing L to permit exit flow 59 between the plate 52 and protuberances 42, where L can be about 0.1 inch, or at least 4 to 5 times the protuberance height H. The diameter of apertures 56 can be on the order of 0.030 inch, and the apertures 56 can be spaced apart on the order of 5 to 6 aperture diameters, though other aperture diameters and spacings K can be used. Tests showed that with generally hemispherical protuberances with height H between 0.010 and 0.020 inch, the maximum convective heat transfer at the textured surface was obtained for L=0.100 inch. Increasing or decreasing L by 0.050 inch decreased the convective heat transfer between 3 and 4 percent.

Tests were performed on a flat plate having smooth surface sections and textured surface sections. Referring to the schematic in FIGS. 1 and 2, the test textured surface sections had generally hemispherically shaped protuberances with the following parameters: protuberance width w of 0.024 inch, height H of 0.013 inch, x and y spacing of 0.026 inch and 0.027 inch respectively, and 0.065 inch component thickness t. The protuberances were formed by laser welding as described below. The impingement aperture diameter was about 0.030 inch with aperture to aperture spacing K of from 5 to 6 aperture diameters and spacing L of about 0.10 inch. The pressure and temperature of the cooling air in plenum 60 were 55 psia and 419° F., and the component was heated at atmospheric pressure by combustion of a stoichiometric fuel/air mixture to provide a heat load through the component. Test results showed an average component metal temperature (the temperature approximately half way through the thickness t of the component) of about 671° F. was obtained with a textured impingement surface, as compared to an average component metal temperature of 709° F. obtained with a smooth impingement surface, when other test parameters were held constant. Alternatively, the test showed that the textured impingement surface required from 30 to 40 percent less cooling airflow to provide the same average component metal temperature obtained with a smooth impingement surface.

Tests were also performed on a component surface textured by flame spraying the surface with an alloy powder to form a random array of irregular protuberances. Results for the flame sprayed textured surface were better than the results for a smooth surface but not as good as the results for the surface textured with generally hemispherically shaped protuberances.

The protuberances for texturing a surface 42 of the component to be cooled can be integrally cast on surface 24. Other methods for texturing the surface could include flame spraying, electro-discharge machining, or chemical etching. Alternatively, some surfaces can be textured by disposing protuberances on the surface by laser weld deposition. A method of texturing a surface by laser weld deposition is described below. U.S. Pat. No. 4,724,299, Laser Spray Nozzle and Method, issued to Hammeke, discloses apparatus and method for laser cladding with alloy powder and is incorporated herein by reference. U.S. Pat. Nos. 4,730,093 and 4,743,733, Method and apparatus for Repairing Metal in an Article, issued to Mehta et al., disclose a method and apparatus for laser repair with alloy powder and are incorporated herein by reference.

Examples are provided to illustrate the formation of generally semi-spherically shaped protuberances of varying size. The illustrative examples below describe a method for applying an inconel 718 alloy powder to an inconel 718 component material, to provide protuberances having substantially the same chemical composition as the component material. Other combinations of powder composition and component material can be made. The alloy powder is preferably 50–150 micron powder.

Figure 3:
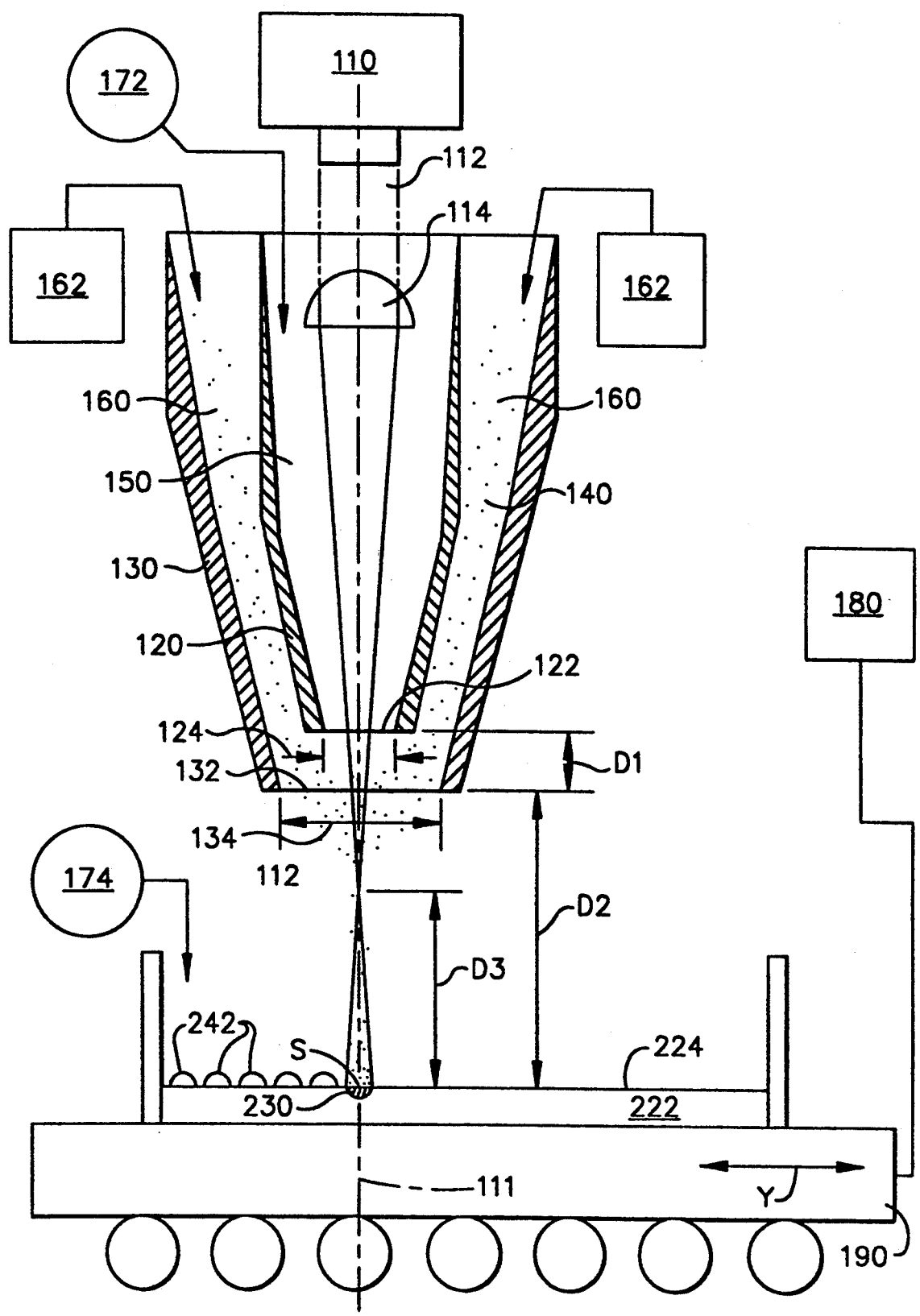
FIG. 3 is a schematic illustration of a method for texturing a surface with a plurality of laser welds.

An apparatus used in texturing a component surface with generally semi-spherical protuberances is illustrated schematically in FIG. 3. A laser 110 directed a laser beam 112 to a 5 inch focusing lens 14. The laser used was a slow axial-flow Co2 laser, such as a Coherent General Model S48 laser, which preferably includes an ECQ unit (quarter wave plate) for providing uniform beam polarization. The laser 110 can run in a continuous wave or pulsed mode. The laser beam mode can be gaussian.

The lens 114 directed the laser beam 112 through a first nozzle aperture 122 in an inner nozzle 120 and through a second nozzle aperture 132 in a second outer nozzle 130. The first nozzle aperture diameter 124 was about 0.045 inch, and the second nozzle aperture diameter 134 was about 0.100 inch. The first nozzle aperture was spaced a distance D1 of about 0.125 inch along the laser beam axis 111 from the second nozzle aperture. The second nozzle aperture was spaced a distance D2 of about 0.150 inch from the component surface 224 on component 222, except as described below. The focal distance D3 of the laser beam was about 0.025 inch above the component surface 224, forming a beam spot size S on the component surface 224.

Alloy powder 160 was delivered into the annular space 140 between the first and second nozzles 120 and 130 to flow coaxially with the beam axis 111 into a molten pool 230 formed on the component surface 224 by the laser beam 112. The powder was delivered from one or more powder sources 162 by a commercially available powder feeder, such as a Metco model 3MP powder feeder. Alternatively, a single point nozzle could be used with powder delivered from a side location.

An inert gas such as argon gas was supplied from a gas source 172 into the space 150 in the first nozzle 120 coaxially with the beam axis 111 at a rate of about eight cubic feet per hour. The component surface 224 was also flooded with inert gas such as argon gas from a supply 174 to provide an inert gas shield for surface 224.

Parameters, including laser power, laser beam spot size S on the component surface 224, weld dwell time, and powder feed rate, were varied to produce protuberances of various sizes. Laser power was varied from 25 to 500 watts. Laser beam spot size S on the component surface varied from 0.010 to 0.060 inch in diameter. Weld dwell times were varied between 0.1 second and 0.3 second. Powder feed rates were varied from 1.3 to 5.0 grams per minute. Examples below recite specific parameters for particular laser weld protuberance sizes.

The component surface 224 was textured by disposing an array of discrete protuberances 242 on the surface 224 as discrete laser welds. A programmable numerical controller 180 was programmed to control movement of the component surface 224 relative to the laser beam axis 111 in a predetermined manner, so that the protuberance array pattern on the component surface 224 was controlled by the programmable controller 180. The component 222 was mounted on movable support means 190, such as a table with motion capability in two independent directions: for instance, y as indicated in FIG. 3 and x normal to y and into the plane of FIG. 3. The component 222 was mounted on the table 190 so that the surface 224 to be textured was substantially coplanar with the two independent movement directions of the table, x and y. The programmable controller 180, such as a Aerotech model Unidex 16, was programmed to control movement of the table 190 with respect to a stationary laser beam axis 111. Alternatively, the component 222 could be held stationary with controlled movement of the laser beam axis 111.

The preferred process for forming an array of discrete laser weld protuberances 242 included the following steps: moving the component surface 224 relative to the laser beam axis 111 along a first direction y to position the beam axis 111 at a first predetermined protuberance location on the surface 224, holding the component surface 224 stationary for a first predetermined length of time to eliminate vibration of the component 222, directing a metered flow of powder 160 coaxially with the beam axis 111 to the first predetermined protuberance location on the surface 224, energizing the laser 110 for a predetermined dwell time while holding the component 222 stationary with respect to the laser beam axis 111 to form a molten pool 230 at the first predetermined location on the component surface 224 and to form a generally semi-spherical weld bead protuberance 242 extending from the component surface, de-energizing the laser 110, holding the component surface 224 stationary for a second predetermined period of time to permit cooling of the laser weld bead protuberance 242, moving the component surface 224 relative to the laser beam axis 111 along the first direction to position the beam axis at a second predetermined protuberance location on the surface spaced from the first location, and repeating the proceeding steps to form a row of spaced apart weld protuberances 242. A second row can be formed with substantially the same steps after moving the component surface 224 relative to the laser beam axis 111 along a second direction x to establish the spacing between adjacent rows of protuberances. The method described can be used to form an array of protuberances such as that shown in FIG. 2.

The first and second predetermined periods of time for reducing vibration of the component surface and cooling the weld protuberance are preferably about 0.2 seconds. A cooling period of 0.1 second was found to be too short in that distortion of the weld protuberance shape occurred prior to solidification.

The laser dwell time could be established by using a mechanical shutter to deflect the laser beam from the component surface. However, a mechanical shutter will partially block the beam for some length of time as it is positioned to deflect the beam, and the partial blockage can affect the effective dwell time and protuberance weld quality. Therefore, it is preferably to establish the laser beam dwell time by energizing and de-energizing the laser.

Preferably the laser beam power, beam spot size S, weld dwell time, and powder feed rate are selected to form a molten puddle or pool on the component surface into which the alloy powder is directed and melted. A fused bond is thereby formed between the protuberance and the component for minimum resistance to conductive heat transfer between the component and the protuberance. The laser beam power, spot size and dwell time should be sufficient to liquefy, but not vaporize the component surface. The powder rate is selected to provide sufficient material to form the desired size protuberance without significantly blocking the beam, which would prevent liquification of the surface of the component. In addition, the laser beam power, spot size, weld dwell time, and powder feed rate are preferably selected to maintain liquification of the molten puddle on the component surface as powder particles are directed into it. The surface tension in the initially liquid protuberance will aid in the formation of generally smooth, uniformly shaped semi-spherical protuberances which solidify during the second predetermined time period for cooling the weld bead.

EXAMPLES

As a first example, generally hemispherically shaped protuberances having a diameter w (FIGS. 1 and 2) of about 0.016 inch and having height H of about 0.008 inch were formed with the laser beam in continuous wave, gaussian mode and at a power level of 250 watts. The beam spot size S on the component surface was 0.010 to 0.011 inch in diameter at 250 watts (between 490 and 410 kWatt/square centimeter), the powder feed rate was about 1.3 grams per minute, and the weld dwell time was about 0.1 second.

As a second example, generally hemispherically shaped protuberances having a diameter of about 0.025 inch and having height H of about 0.012 inch were formed with the laser in a continuous wave, gaussian mode and at a power level of 350 watts. The beam spot size was 0.010 to 0.011 inch in diameter, the powder feed rate was about 1.5 gram per minute, and the weld dwell time was about 0.1 second.

As a third example, generally hemispherically shaped protuberances having a diameter of about 0.036 inch and height H of about 0.018 inch were formed with the laser beam in a continuous wave gaussian mode and at a power level of 550 watts and a beam spot size of about 0.022 inch. The focal distance D3 (FIG. 3) above the component surface was about 0.175 inch, and the second nozzle was spaced a distance D2 about 0.3 inch above the component surface. The laser weld dwell time was about 0.3 seconds. The powder feed rate was about 2 grams per minute.

As a fourth example, built-up columnar protuberances with cylindrically shaped base portions capped with generally hemispherically shaped portions were formed with a series of welds made using a 25 watt average power pulsed wave having a 0.005 second pulse at 100 Hz. The beam spot size S used was about 0.010 to 0.011 inch in diameter, and the powder feed rate was about 1.5 gram per minute. A series of three welds with a 0.1 second weld dwell time per weld and a 0.2 second delay between welds yielded a protuberance with a cylindrical base portion having a 0.024 inch diameter and a 0.005 inch height, and a hemispherically shaped cap portion having a 0.024 inch diameter.

Semi-spherically shaped protuberances intermediate a hemisphere and a full sphere can formed with a maximum protuberance diameter greater than the diameter at the protuberance base at the component surface. Such protuberances can be formed by increasing the weld dwell times listed in the first three examples above.

While this invention has been disclosed and described with respect to a preferred embodiment, it will be understood by those skilled in the art that various changes and modifications may be made without departing from the spirit and scope of the invention as set forth in the following claims. For instance, the textured impingement surface has been described with reference to cooling impingement and high heat flux applications, but the invention can also be adapted for use where impingement air is used to heat a component or in low heat flux applications. Accordingly, what is desired to be secured by Letters Patent of the United States is the invention as defined and set out in the following claims:

We claim:

1. An improved component heat transfer assembly for use in a gas turbine engine, the assembly comprising:
   a. a component including a textured surface: and
   b. impingement means spaced from the textured surface for directing an impinging fluid to directly impinge upon the textured surface; and
   c. wherein the textured surface comprises an array of protuberances extending from a first surface and wherein the impingement means is spaced from the protuberances for directing an impinging fluid to directly impinge upon a plurality of the protuberances;
   d. wherein the protuberances are generally semi-spherical in shape.

2. An improved component heat transfer assembly for use in a gas turbine engine, the assembly comprising:
   a. a component including a textured surface; and
   b. impingement means spaced from the textured surface for directing an impinging fluid to directly impinge upon the textured surface; and
   c. wherein the textured surface comprises an array of protuberances extending from a first surface and wherein the impingement means is spaced from the protuberance for directing an impinging fluid to directly impinge upon a plurality of the protuberances;
   d. wherein the protuberances are generally hemi-spherical in shape.

3. An improved component heat transfer assembly for use in a gas turbine engine, the assembly comprising:
   a. a component including a textured surface; and
   b. impingement means spaced from the textured surface for directing an impinging fluid to directly impinge upon the textured surface; and
   c. wherein the textured surface comprises an array of protuberances extending from a first surface and wherein the impingement means is spaced from the protuberances for directing an impinging fluid to directly impinge upon a plurality of the protuberances;

d. wherein the protuberances are generally hemispherical in shape and wherein the protuberances extend above the first surface with a height less than or equal to 0.020 inch.

4. The assembly of claim 3 wherein a protuberance-to-protuberance spacing of the protuberances on the first surface is less than two times the diameter of the protuberances.

5. An improved component heat transfer assembly for use in a gas turbine engine, the assembly comprising:
   a. a component including a textured surface; and
   b. impingement means spaced from the textured surface for directing an impinging fluid to directly impinge upon the textured surface; and
   c. wherein the textured surface comprises an array of protuberances extending from a first surface and wherein the impingement means is spaced from the protuberances for directing an impinging fluid to directly impinge upon a plurality of the protuberances;
   d. wherein the protuberances are discrete hemispherical weld beads disposed on the first surface.

* * * * *